2,833,761

SULFAPYRIDAZINES AND METHODS OF PREPARING THE SAME

Dorothy M. Murphy, Riverside, Conn., and Robert G. Shepherd, Ridgewood, N. J., assignors to American Cyanamid Company, New York, N. Y., a corporation of Maine No Drawing. Application January 28, 1957
Serial No. 636,475

9 Claims. (Cl. 260—239.7)

This invention relates to new organic compounds. More particularly, it relates to $N^1$-acylated sulfapyridazines and methods of preparing the same.

The $N^4$-acyl sulfapyridazines are well known, having been described by Roblin and Winnek, United States Patent No. 2,371,115, and by others. These compounds were intermediates for the preparation of such sulfa drugs as sulfapyridazine, 3-sulfanilamido-6-chloropyridazine, and the like and do not in themselves possess useful antibacterial activity. On the other hand, the $N^1$-acylated sulfapyridazines of the present invention are used as such, and one of their principal properties is the fact that they retain their antibacterial activity while being comparatively tasteless. These properties are highly desirable, since drugs such as sulfapyridazine, when fed to animals or human beings, have a tendency to impart a bitter taste to food or water in which they are given. Because of the bitter taste, the animals will consume the medicated food or water sparingly or not at all.

The compounds of the present invention may be illustrated by the following general formula:

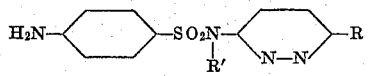

in which R is hydrogen or a halo, lower alkyl, or lower alkoxy radical and R' is an alkanoyl radical. The radical R' can be an acetyl, propionyl, butyryl, valeryl, caproyl, etc. radical. The radical R can be chloro, bromo, or iodo; methyl, ethyl, propyl, isopropyl, methoxy, ethoxy, propoxy, isopropoxy, and the like.

The $N^1$-acyl compounds of the present invention are useful as antibacterial agents for combating gram-positive and gram-negative bacteria. The following table shows a comparison of the activity of compounds such as $N^1$-acetyl - 3 - sulfanilamido - 6 - methoxypyridazine and 3-sulfanilamido-6-methoxypyridazine when treating infections of *Pasteurella multocida*.

TABLE

*Comparison of Kynex and $N^1$-acetyl Kynex in the Pasteurella multocida No. 310 infection in CF1 mice*

3-SULFANILAMIDO-6-METHOXYPYRIDAZINE (KYNEX)

| Drug Intake,[a] mg./kg./day | Survival[b] Ratio | Percent Effect |
|---|---|---|
| 200 | 39/40 | 97.5 |
| 100 | 39/40 | 97.5 |
| 48 | 23/40 | 57.5 |
| 27 | 6/40 | 15 |
| 17 | 2/40 | 5 |

Median effective dose=41 (35-48) mg./kg./day.

$N^1$-ACETYL-3-SULFANILAMIDO-6-METHOXYPYRIDAZINE
($N^1$-ACETYL KYNEX)

| | | |
|---|---|---|
| 400 | 20/20 | 100.0 |
| 190 | 39/40 | 97.5 |
| 96 | 37/40 | 92.5 |
| 49 | 22/40 | 55.0 |
| 25 | 3/40 | 7.5 |
| 14 | 2/20 | 10.0 |

Median effective dose=52 (40-68) mg./kg./day.

[a] Each drug intake value is an average based on 2 to 4 tests; in each test there were ten mice per drug-diet level.
[b] Survival ratio=number of mice alive/total mice tested, as of the 21st day after infection.
Figures in parentheses indicate 95% confidence limits for each median.

The above table shows that $N^1$-acylated compounds have comparable antibacterial activity to the non-acylated compounds. In addition, the $N^1$-acylated compounds are tasteless, while non-acylated compounds are bitter. A bitter taste in a liquid or solid oral drug is highly undesirable.

The compounds of the present invention can be prepared by protecting the $N^4$-position of the sulfa drug with a blocking group which can be removed by non-hydrolytic means. The $N^4$-substituted sulfa drug is then acylated in the $N^1$-position and the blocking group in the $N^4$-position is removed by a non-hydrolytic reaction, such as the catalytic reduction of a carbobenzoxy group or a nitro group. Following completion of the reaction, indicated by cessation of the reaction mixture to take up hydrogen, the catalyst is separated by filtration. The product is further purified by recrystallization when neecssary.

The present compounds can also be prepared by direct acylation in the $N^1$-position of the sulfa pyridazines under carefully regulated experimental conditions. The product can then be purified by recrystallization or by other means well known to those skilled in the art.

In preparing the $N^1$-acylsulfapyridazines of the present invention, two different classes of intermediates can be used. The choice of intermediate is determined by the process used. As described above, representative of the two groups are those intermediates containing in the 4-position an amino group wherein acylation is carried out directly and those having a protected amino group, such as a carbobenzoxyamino, or a nitro group, convertible to amine by non-hydrolytic means.

The compounds of the present invention can be used in the form of tablets, pills, powders, etc., which may also contain starch, excipients, and other ingredients necessary to the compounding of such dosage forms. They may also be used singly or in combination with other sulfa drugs or with antibiotics in liquid preparations to which they are especially suited because of their comparative tastelessness. For use in animals they can be mixed in food or drinking water.

EXAMPLE 1.—$N^1$-ACETYL-3-SULFANILAMIDO-6-METHOXYPYRIDAZINE 56 g. (0.2 mole) 3-sulfanilamido-6-methoxypyridazine is dissolved in 100 cc. $H_2O$ and 21.5 cc. of 10 N sodium hydroxide. 47.25 g. (0.25 real equivalents) of carbobenzoxychloride (95%) and 52 cc. of 5 N sodium hydroxide are then added dropwise and simultaneously over a period of twenty minutes. The temperature is kept at 35°–40° C. Stirring of the mixture is vigorous throughout the addition and is continued for one hour, during which time a solid is formed. The solid is dissolved with alkali and warm water, and the resulting clear solution is added to dilute hydrochloric acid solution at below 20° C. to precipitate the product. The product is a fine white powder; melting point 186°–187° C. (with decomposition; corr.) after a second precipitation.

The $N^4$-carbobenzoxy-3-sulfanilamido-6-methoxypyridazine prepared above (75.6 g.; 0.182 mole) is dissolved in 52.2 cc. acetic anhydride and 133 cc. dry pyridine. The solution is heated to 90°–95° C. for 45 minutes. The reaction mixture is cooled and water and 80 cc. of 5 N sodium hydroxide are added with stirring to precipitate the product. The product is filtered, washed with 1 M ammonium hydroxide, then with water, and dried. Recrystallization from methanol gives material melting at 195°–196° C. corr.

The $N^4$ - carbobenzoxy - $N^1$ - acetyl - 3 - sulfanilamido-6-methoxypyridazine prepared immediately above (9 g., 0.02 mole) is dissolved in 100 cc. dioxane. 3.0 g. of 10% palladium on carbon catalyst is added and the mixture is reduced under low pressure hydrogen for 40 minutes. The mixture is filtered and the clear filtrate is treated with 200 cc. water and seeded to crystallize the product as fine white crystals, melting point 178°–179° C. dec. (melting point varies considerably with rate of heating).

EXAMPLE 2.—$N^1$-ACETYL-3-SULFANILAMIDO-6-CHLOROPYRIDAZINE 5.0 g. (0.0175 mole) 3-sulfanilamido-6-chloropyridazine are dissolved in 35 cc. acetone and 1.35 cc. (0.0175 mole) dry pyridine at room temperature. 1.62 cc. (0.0175 mole) acetic anhydride are added slowly with stirring. The solution is stirred for one hour, during which time some solid formed. The reaction slurry is treated with 50 cc. of water and evaporated in the air to leave a yellow solid. This is washed with 1 M ammonium hydroxide, and the insoluble solid is filtered, washed, and dried. The product is in the form of white crystals, melting at 221°–223° C. (corr.) after recrystallization from cold acetone-water.

EXAMPLE 3.—$N^1$-ACETYL-3-SULFANILAMIDO-6-METHYLPYRIDAZINE 1.0 g. (0.0035 mole) sodium-3-sulfanilamido-6-methylpyridazine is slurried with 7.0 cc. of N.N-dimethylacetamide. 0.33 cc. (0.0035 mole) acetic anhydride is added dropwise with stirring at 25° C. The bright yellow solution is stirred for one hour. The mixture is then chilled in an ice-alcohol bath and water is added to crystallize out a pale yellow solid. This solid is filtered, washed with 1 M ammonium hydroxide, then with water and dried. The product is a colorless crystalline solid, melting at 121°–122° C. (corr.) after recrystallization from cold acetone-water.

EXAMPLE 4.—$N^1$-ACETYL-3-SULFANILAMIDO PYRIDAZINE

Using the procedure described in Example 2, $N^1$-acetyl-3-sulfanilamido pyridazine is prepared from 3-sulfanilamidopyridazine and acetic anhydride and isolated in the same manner. This product is pale yellow crystals melting at 200°–201° C. after recrystallization from acetonitrile.

EXAMPLE 5.—$N^1$-ACETYL-3-SULFANILAMIDO-6-METHOXYPYRIDAZINE 5.0 g. (0.018 mole) 3-sulfanilamido-6-methoxypyridazine is dissolved in 100 ml. (1.24 mole) pyridine. This solution is cooled to 0° and with stirring 2 ml. (0.021 mole) acetic anhydride is added dropwise. The temperature is maintained at 0°–10° C. with stirring for 1 hour. The solution is then concentrated to ⅓ its volume and the product is precipitated by addition of an equal volume of both water and 1 M ammonium hydroxide. After filtering and drying, the white solid melts at 176.5°–178° C. The infrared spectrum of the product is identical with the product in Example 1 and is analytically pure.

EXAMPLE 6.—$N^1$-ACETYL-3-SULFANILAMIDO-6-METHOXYPYRIDAZINE

In a reaction carried out in a manner similar to Example 3, $N^1$-acetyl-3-sulfanilamido-6-methoxypyridazine is prepared from the reaction of sodium 3-sulfanilamido-6-methoxypyridazine and acetic anhydride and isolated in the same manner.

We claim:

1. A compound having the general formula:

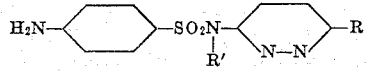

in which R is a member of the group consisting of hydrogen, bromo, chloro, iodo, lower alkyl, and lower alkoxy radicals and R' is a lower alkanoyl radical.

2. The compound $N^1$-acetyl-3-sulfanilamido-6-methoxypyridazine.

3. The compound $N^1$-acetyl-3-sulfanilamido-6-chloropyridazine.

4. The compound $N^1$-acetyl-3-sulfanilamido-6-methylpyridazine.

5. The compound $N^1$-acetyl-3-sulfanilamidopyridazine.

6. A method of preparing compounds having the general formula:

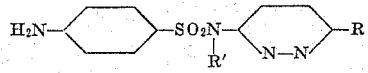

in which R is a member of the group consisting of hydrogen, bromo, chloro, iodo, lower alkyl, and lower alkoxy radicals and R' is a lower alkanoyl radical, which comprises reacting a compound having the formula:

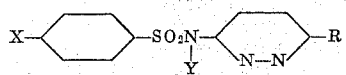

in which X is a member of the group consisting of nitro and carbobenzoxyamino radicals, Y is a member of the group consisting of sodium and hydrogen and R is as defined above with a member of the group consisting of lower alkanoic acid anhydrides and lower alkanoyl chlorides and subsequently hydrogenating the reaction product and recovering said compound therefrom.

7. A method of preparing an $N^1$-lower alkanoyl-3-sulfanilamido-6-methoxypyridazine which comprises reacting $N^4$-carbobenzoxy-3-sulfanilamido-6-methoxypyridazine with a lower alkanoic acid anhydride and subsequently hydrogenating the reaction product.

8. A method of preparing $N^1$-acetyl-3-sulfanilamido-6-methoxypyridazine which comprises reacting $N^4$-carbobenzoxy-3-sulfanilamido-6-methoxypyridazine with acetic anhydride and subsequently removing the carbobenzoxy radical by reduction with hydrogen and a palladium catalyst.

9. A method of preparing $N^1$-acetyl-3-sulfanilamido-6-methoxypyridazine which comprises reacting 3-sulfanilamido-6-methoxypyridazine with acetic anhydride in the presence of pyridine and recovering said product therefrom.

References Cited in the file of this patent

UNITED STATES PATENTS

| | | |
|---|---|---|
| 2,371,115 | Winnek et al. | Mar. 6, 1945 |
| 2,721,200 | Hoffer | Oct. 18, 1955 |

OTHER REFERENCES

Fuson: "Advanced Organic Chemistry," Wiley and Sons, 1950, page 261.